US011997000B2

(12) United States Patent
Mishra et al.

(10) Patent No.: US 11,997,000 B2
(45) Date of Patent: May 28, 2024

(54) METHOD AND APPARATUS FOR SURVIVAL TIME HANDLING FOR TIME SENSITIVE CONNECTIONS

(71) Applicant: Mavenir Systems, Inc., Richardson, TX (US)

(72) Inventors: Abhishek Mishra, Bangalore (IN); Vipin Padlikar, Bangalore (IN); Rohit Gupta, Bangalore (IN); Tamanna Jindal, McKinney, TX (US)

(73) Assignee: Mavenir Systems, Inc., Richardson, TX (US)

(*) Notice: Subject to any disclaimer, the term of this patent is extended or adjusted under 35 U.S.C. 154(b) by 111 days.

(21) Appl. No.: 17/731,324

(22) Filed: Apr. 28, 2022

(65) Prior Publication Data

US 2022/0353167 A1    Nov. 3, 2022

(30) Foreign Application Priority Data

May 3, 2021 (IN) .............................. 202121020229

(51) Int. Cl.
*H04L 43/20* (2022.01)
*H04L 43/0823* (2022.01)
(Continued)

(52) U.S. Cl.
CPC .......... *H04L 43/20* (2022.05); *H04L 43/0823* (2013.01); *H04L 43/12* (2013.01); *H04L 43/50* (2013.01)

(58) Field of Classification Search
CPC ..... H01L 43/20; H01L 43/0823; H01L 43/12; H01L 43/50; H01L 43/0811; H01L 43/062
See application file for complete search history.

(56) References Cited

U.S. PATENT DOCUMENTS

| 2014/0149572 A1* | 5/2014 | Menezes ................ H04L 67/14 709/224 |
| 2020/0259896 A1 | 8/2020 | Sachs et al. |

(Continued)

FOREIGN PATENT DOCUMENTS

| WO | 2021002873 A1 | 1/2021 |
| WO | 2021029862 A1 | 2/2021 |

(Continued)

OTHER PUBLICATIONS

3GPP TS 23.502 v16.4.0:"3rd Generation Partnership Project; Technical Specification Group Services and Systems Aspects; Procedures for the 5G System (5GS); Stage 2, Release 16" (Mar. 2020) 3GPP Partnership Project.

(Continued)

*Primary Examiner* — John A Follansbee
*Assistant Examiner* — Fadi Haj Said
(74) *Attorney, Agent, or Firm* — Ruggiero McAllister & McMahon LLC

(57) ABSTRACT

A method for time sensitive network (TSN) operation includes: in the case of data traffic stoppage in a communication channel of TSN due to at least one of down time of a user plane (UP) connection and a reset of the UP connection, performing the following: generating, by a user plane function (UPF), an audit report about the at least one of the down time and the reset; sending, by the UPF, the audit report to a first element in control plane (CP), without waiting for communication from the CP; and determining, by one of the first element or a second element in the CP, survival time of the communication channel. The audit report is sent along with a report type indicating the down time of the UP connection due to connection fluctuation or a switch-over of the UP connection from a primary UPF to a back-up UPF.

11 Claims, 6 Drawing Sheets

(51) Int. Cl.
    *H04L 43/12*     (2022.01)
    *H04L 43/50*     (2022.01)

(56) References Cited

U.S. PATENT DOCUMENTS

| | | | |
|---|---|---|---|
| 2022/0183098 A1* | 6/2022 | Zhu | H04W 76/18 |
| 2022/0224446 A1 | 7/2022 | Fan et al. | |
| 2022/0263743 A1* | 8/2022 | Gebert | H04L 45/24 |

FOREIGN PATENT DOCUMENTS

| | | |
|---|---|---|
| WO | 2021056589 A1 | 4/2021 |
| WO | 2021078454 A1 | 4/2021 |

OTHER PUBLICATIONS

3GPP TS 129.244 v16.7:"3rd Generation Partnership Project; LTE: 5G; T Interface between the Control Plane and the User Plane Nodes, Release 16" (Apr. 2021) 3GPP Partnership Project.

3GPP TS 23.501 v16.5.1: "3rd Generation Partnership Project; Technical Specification Group Services and Systems Aspects; System Architecture for the 5G System (5GS) Stage 2, Release 16" (Aug. 2020) 3GPP Partnership Project.

Extended European Search Report for corresponding European application EP22171152.6, 11 pages, dated Sep. 29, 2022.

3GPP TS 23.501 v16.2.0: "3rd Generation Partnership Project; Technical Specification Group Services and Systems Aspects; System Architecture for the 5G System (5GS) Stage 2, Release 16" (Sep. 2019) 3GPP Partnership Project.

3GPP TS 23.502 v16.2.0:"3rd Generation Partnership Project; Technical Specification Group Services and Systems Aspects; Procedures for the 5G System (5GS); Stage 2, Release 16" (Sep. 2019) 3GPP Partnership Project.

3GPP TS 29.244 v16.3.1:"3rd Generation Partnership Project; Technical Specification Group Core Network and Terminals; Interface between the Control Plane and the User Plane Nodes, Release 16" (Apr. 2020) 3GPP Partnership Project.

3GPP TS 24.519 v16.1.0, "3rd Generation Partnership Project; Technical Specification Group Core Network and Terminals; 5G System (5GS); Time-Sensitive Networking (TSN) Application Function (AF) to Device-Side TSN Translator (DS-TT) and Network-Side TSN Translator (NW-TT) Protocol Aspects, Stage 3, Release 16" (Jun. 2020) 3GPP Partnership Project.

3GPP TS 22.104 v 16.3.0, "3rd Generation Partnership Project; Technical Specification Group Services and Systems Aspects; Service Requirements for Cyber-Physical Control Applications in Vertical Domains, Stage 1, Release 16" (Sep. 2019) 3GPP Partnership Project.

* cited by examiner

METHOD AND APPARATUS FOR SURVIVAL TIME HANDLING FOR TIME SENSITIVE CONNECTIONS

BACKGROUND OF THE DISCLOSURE

1. Field of the Disclosure

The present disclosure relates to systems and methods for 5G networks, and relates more particularly to systems and methods for Time Sensitive Network (TSN) operation involving a 5G network.

2. Description of the Related Art

TSN operation is the IEEE 802.1Q-defined technology for ensuring information delivery between two points in a fixed and predictable amount of time. TSN technology is an Ethernet standard, not an Internet Protocol (IP) standard. Because TSN technology is focused on time, one of the requirements for the networking devices implementing TSN technology, e.g., bridges and end devices, is to share a uniform sense of time, and Precision Time Protocol (PTP) is used to maintain a uniform sense of time. The forwarding decisions made by the TSN bridges (also referred to as Ethernet switches) use the Ethernet header contents, not the IP address. Because the payloads of the Ethernet frames can be anything (and are not limited to IP), TSN technology can be used in any environment, e.g., used to carry an industrial application payload.

When mobile and/or wireless networks are used for TSN, User Plane Function (UPF) becomes an important entity through which the TSN data has to be transmitted. 3rd Generation Partnership Project (3GPP) has proposed an architecture (3GPP TS 23.501v16.2.0: "System Architecture for the 5G System," (2019)) which enables the 5G core network to be used for such services.

FIG. 1 shows a TSN in which portions of 5G network 100 are shown as bridges (i.e., virtual TSN bridge 1 1010*a* for a protocol data unit (PDU) session 1, and virtual TSN bridge 2 1010*b* for a PDU session 2), controlling the factory automated system 1001 and factory controller 1002 for the ethernet traffic. The TSN shown in FIG. 1 further includes the following: policy control function (PCF) 1003; application function (AF) 1004, which acts as a TSN translator (TT) in this example; Access and Mobility Management Function (AMF) 1005; session management function (SMF) 1006; user equipment 1 (UE 1) 1007*a* (acting as a TT); UE2 1007*b* (acting as a TT); gNB 1 1011*a*; gNB 2 1011*b*; user plane function 1 (UPF 1) 1008*a* (acting as a TT); UPF 2 1008*b* (acting as a TT); TSN bridge 1 1009*a*; and TSN bridge 2 1009*b*. PCF 1003, AF 1004, AMF 1005 and SMF 1006 are control plane (CP) elements; the elements shown below the CP elements in FIG. 1 are user plane (UP) elements. The TSN shown in FIG. 1 is unsynchronized, i.e., the factory automated system 1001 and the bridges (e.g., 1009*a*, 1009*b*, 1010*a*, 1010*b*) follow different time drifts. The 3GPP has defined procedures (e.g., 3GPP TS 23.501v16.2.0: "System Architecture for the 5G System," (2019); 3GPP TS 23.502v16.2.0:"Procedures for the 5G System," (2019)) for making the time synchronized between the bridges and time-sensitive devices and/or networks connected via TT.

FIG. 2 shows the CP and UP interworking in the 5G network 100, e.g., using interfaces N1, N2, N4, N5, N7 and N11. The TSN shown in FIG. 2 is unsynchronized. The TSN controller 2002 connects to the AF 1004 to inform about the time details and time drifts required to support the communication. The AF 1004, using the PCF 1003, interfaces with the SMF 1006 to installs rules at the UPF 2008 with the time-related information, so that the UP can be synchronized with the TSN.

FIG. 3 shows the call flow for SMF 1006 provisioning the relevant rules at the UPF 2008 for clock synchronization and TT-port creation, e.g., as per 3GPP protocols defined in 3GPP TS 29.244v16.3.1:"Interface between the Control Plane and the User Plane Nodes," (2020) and 3GPP TS 24.519 v16.1.0, "Time-Sensitive Networking (TSN) Application Function (AF) to Device-Side TSN Translator (DS-TT) and Network-Side TSN Translator (NW-TT) Protocol Aspects," (2020). In block 3001, packet forwarding control protocol (PFCP) association setup request is sent from SMF 1006 to UPF 2008, which Setup Request includes clock drift control information, e.g., time domain number (precision time protocol (PTP) domain number), and time offset threshold. In block 3002, PFCP association setup response is sent from UPF 2008 to SMF 1006. In block 3003, PFCP session creation request is sent from SMF 1006 to UPF 2008, which creation request includes "create bridge" information for time sensitive connection (TSC). In block 3004, PFCP session creation response is sent from UPF 2008 to SMF 1006, which creation response includes created bridge information for TSC, e.g., device-side TSN translator (DS-TT) port number; network-side TSN translator (NW-TT) port number; and bridge ID.

The 3GPP has also defined TSN port management procedures, e.g., the CP can ask for the TSN port information, using the PFCP modification procedures. FIG. 4 shows one such call flow, e.g., SMF 1006 doing the port management for the TSN bridge, based on 3GPP specification (3GPP TS 29.244v16.3.1: "Interface between the Control Plane and the User Plane Nodes," (2020)). In block 4001, PFCP session modification request is sent from SMF 1006 to UPF 2008, which modification request includes port management information (request for the TSN port information) for TSC. In block 4002, PFCP session modification response is sent from UPF 2008 to SMF 1006, which modification response includes port management information (requested TSN port information) for TSC and port management information container for TSC.

The ethernet connections in a TSN may fluctuate (i.e., the connection goes down and subsequently comes back up) at certain times between the UPF (TT) and the TSN Controller, in which cases the UP connection between the UPF (TT) and TSN will be subjected to a reconnection attempt involving a reset of the UP connection. In the above scenario involving a reset of the UP connection, there are times when the data traffic stops flowing in the UP (e.g., during a reset and/or during down time), but there is no audit mechanism at the UPF that can notify the CP about the data traffic stoppage. In addition, the UPF (TT) may trigger high availability (HA) procedures involving implementation of a failover, i.e., automatically switch to a backup system component in case of a failure of a primary system component. FIG. 5 shows one such example in which the connection is switched from UPF 1 5008*a* (TT) to UPF 2 5008*b* (backup TT). The TSN shown in FIG. 5 is synchronized.

In both of the above situations (data traffic stoppage associated with a reset of the UP connection, and failover), miscalculation of "survival time" occurs. As defined in 3GPP TS 22.104 v 16.3.0, "Service requirements for cyber-physical control applications in vertical domains," (2019), "survival time" refers to the time period that a communication service may continue without meeting an application's requirement before the communication service is deemed to be in an unavailable state. In other words, the communication service is considered unavailable to the application when an expected message is not received by the application after application's survival time expires.

Accordingly, there is a need for a method for ensuring correct calculation of survival time, e.g., in scenarios involving a failover and/or data traffic stoppage due to reset of UP connection.

SUMMARY OF THE DISCLOSURE

According to an example embodiment according to the present disclosure, a method for time sensitive network (TSN) operation includes: in the case of data traffic stoppage in a communication channel of TSN due to at least one of down time of a user plane (UP) connection and a reset of the UP connection, performing the following: generating, by a user plane function (UPF), an audit report about the at least one of the down time and the reset; sending, by the UPF, the audit report to a first element in control plane (CP), without waiting for communication from the CP; and determining, by one of the first element or a second element in the CP, survival time of the communication channel. The audit report is sent along with a report type indicating the down time of the UP connection due to connection fluctuation or a switch-over of the UP connection from a primary UPF to a back-up UPF.

According to an example embodiment according to the present disclosure, the audit report is sent along with a report type indicating one of i) down time of the UP connection due to connection fluctuation, or ii) down time of the UP connection due to a switch-over of the UP connection from a primary user plane function (UPF) to a back-up UPF.

According to an example embodiment according to the present disclosure, in the case the down time of the UP connection is due to the switch-over of the UP connection from the primary user plane function (UPF) to the back-up UPF, the audit report is sent by the back-up UPF.

According to an example embodiment according to the present disclosure, in the case the report type indicates down time of the UP connection due to connection fluctuation, the audit report includes at least one of the following information: operation status, IP address: display name; interface name; virtual routing and forwards (VRF); virtual local area network (VLAN); physical address; protocol type; start time for TSN session; previous down time; and duration of down time.

According to an example embodiment according to the present disclosure, in the case the report type indicates down time of the UP connection due to the switch-over of the UP connection from the primary user plane function (UPF) to the back-up UPF, the audit report includes at least one of the following information: operation status, IP address: display name; interface name; virtual routing and forwards (VRF); virtual local area network (VLAN); old physical address; new physical address; protocol type; start time for TSN session; previous down time; and duration of down time.

DETAILED DESCRIPTION

Figure 6:
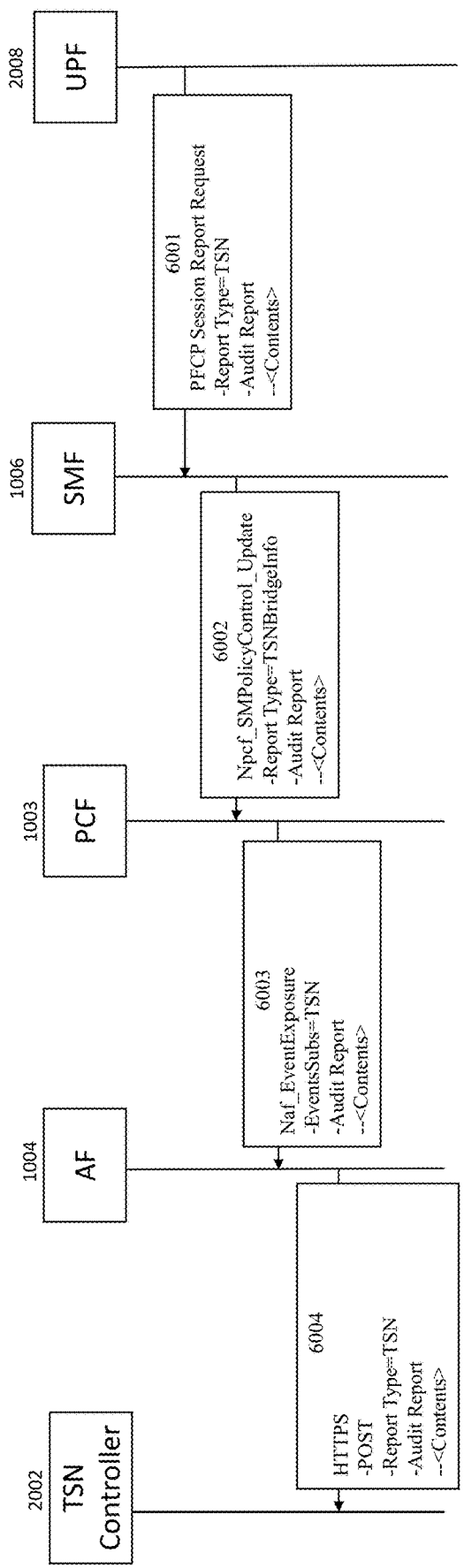
FIG. 6 illustrates a call flow for an example embodiment of a method according to the present disclosure.

In an example embodiment of a method according to the present disclosure, in the event of experiencing data traffic stoppage in TSN due to down time and/or a reset of the UP connection, the UP generates and sends an audit report to the CP (e.g., SMF 1006 in the CP), without waiting for any communication from the CP, as shown in FIG. 6. In block 6001 in FIG. 6, UPF 2008 sends to SMF 1006 a "PFCP Session Report Request" message including i) Report Type=TSN, and ii) an Audit Report having specified contents. The contents of an Audit Report can include the following fields:
Operation Status: <up|down>
IP Address: <ipv4address|ipv6address>
Display Name: <string>
Interface Name: <string>,
VRF (s): <string "," separated>
VLAN(s): <integer "," separated>
Physical Address: <macAddress>
(protocol) Type: <IP|Ethernet>
Start Time for TSN session for a specific connection: <Date Time>
Previous Down Time: <Date Time>
Duration of Down Time: <milliseconds>
As an example, the following could be included in the Audit Report:
Operation Status: up
IP Address: [10.10.1.2]
Display Name: UPF[TT]
Interface Name: eth5
VRF: VRF1
VLAN: 501
Physical Address: 10-65-30-12-F5-1B
(protocol) Type: Ethernet
Start Time for TSN session for a specific connection: 7/16/2020, 12:39:57 PM
Previous Down Time: 7/17/2020, 19:44:50 PM
Duration of Down Time: 25000 ms
Next, as shown in block 6002 in FIG. 6, SMF 1006 sends to PCF 1003 an update, NPCF Session Management Policy Control Update (Npcf_SMPolicyControl_Update), which message includes i) Report Type=TSN Bridge Information (TSNBridgeInfo), and ii) the Audit Report received from UPF 2008. In block 6003, PCF 1003 sends to AF 1004 a Network Application Function (NAF) Event Exposure message including: i) Events Subscription=TSN, and ii) the Audit Report received from SMF 1006. In block 6004, AF 1004 sends to TSN controller 2002 a Hypertext Transfer Protocol Secure (HTTPS) POST request message including i) Report Type=TSN, and ii) the Audit Report received from PCF 1003. The survival time can be computed at SMF 1006 or AF 1004.

Figure 1:
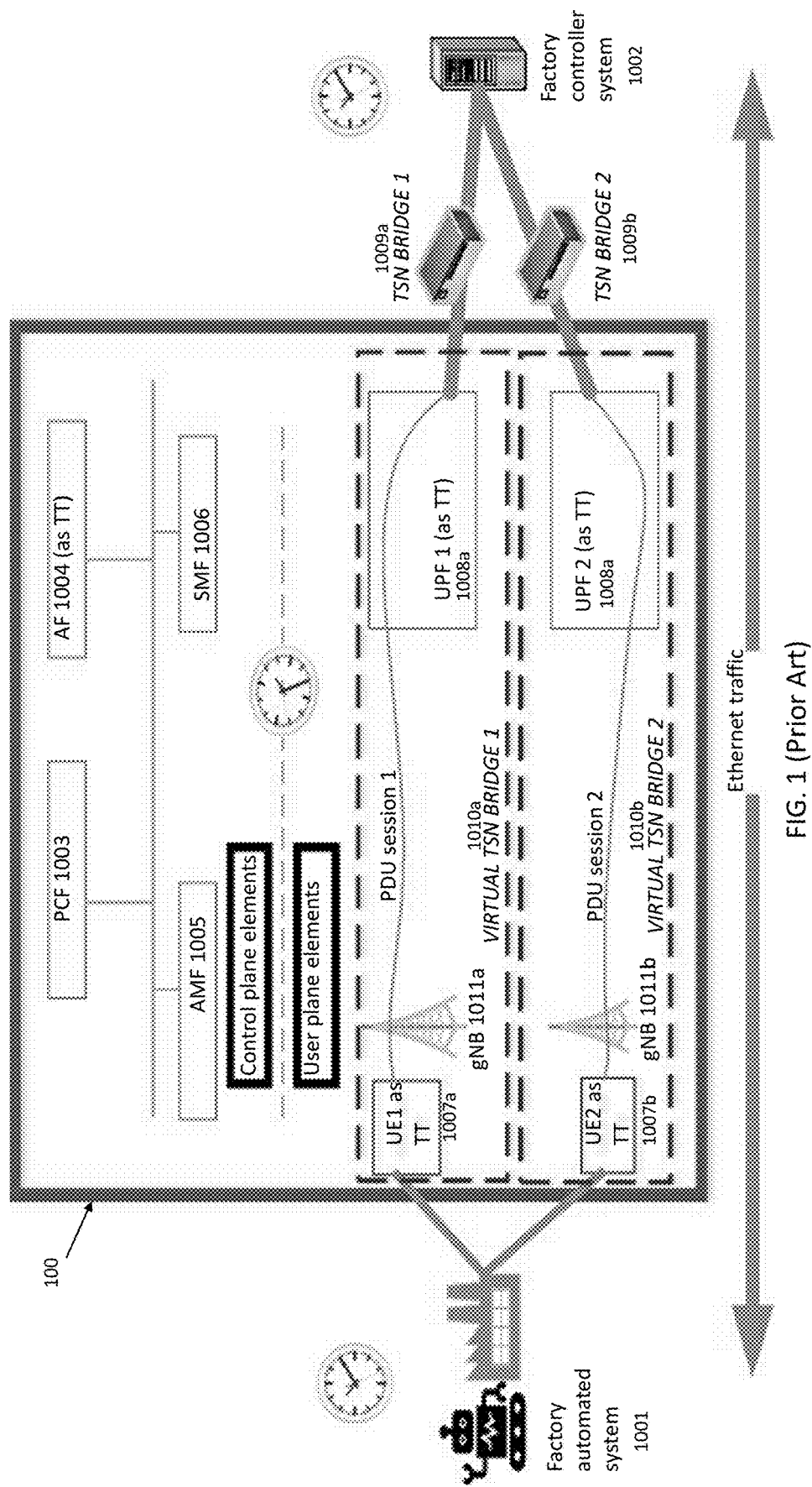
FIG. 1 illustrates an example TSN.
Figure 2:
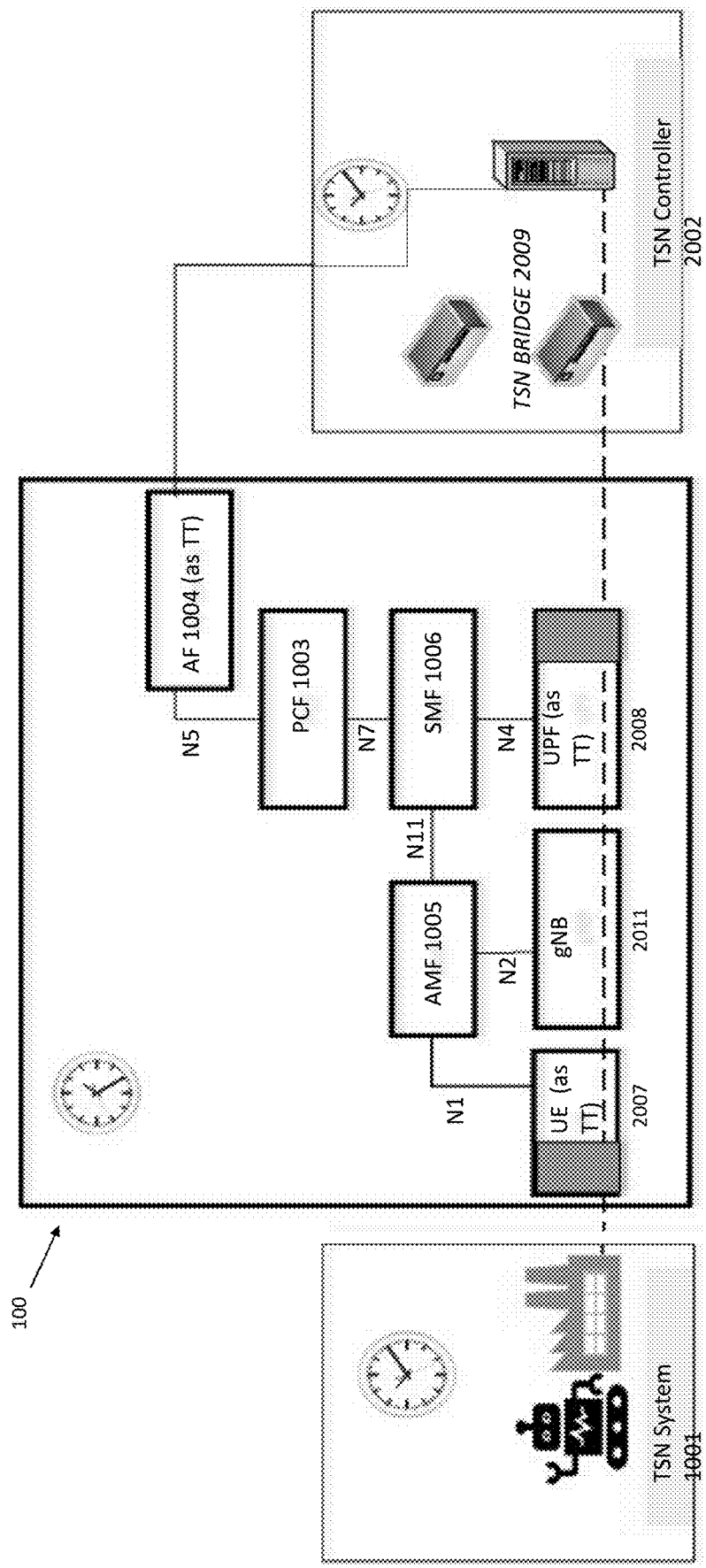
FIG. 2 illustrates CP and UP interworking in a 5G network.
Figure 4:
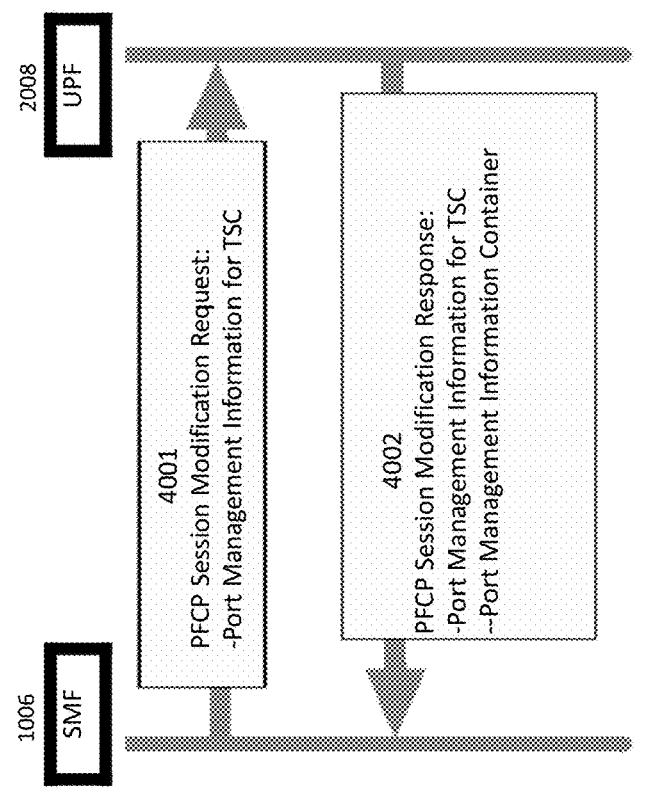
FIG. 4 illustrates an example call flow between a UPF and an SMF doing port management for a TSN bridge.
Figure 3:
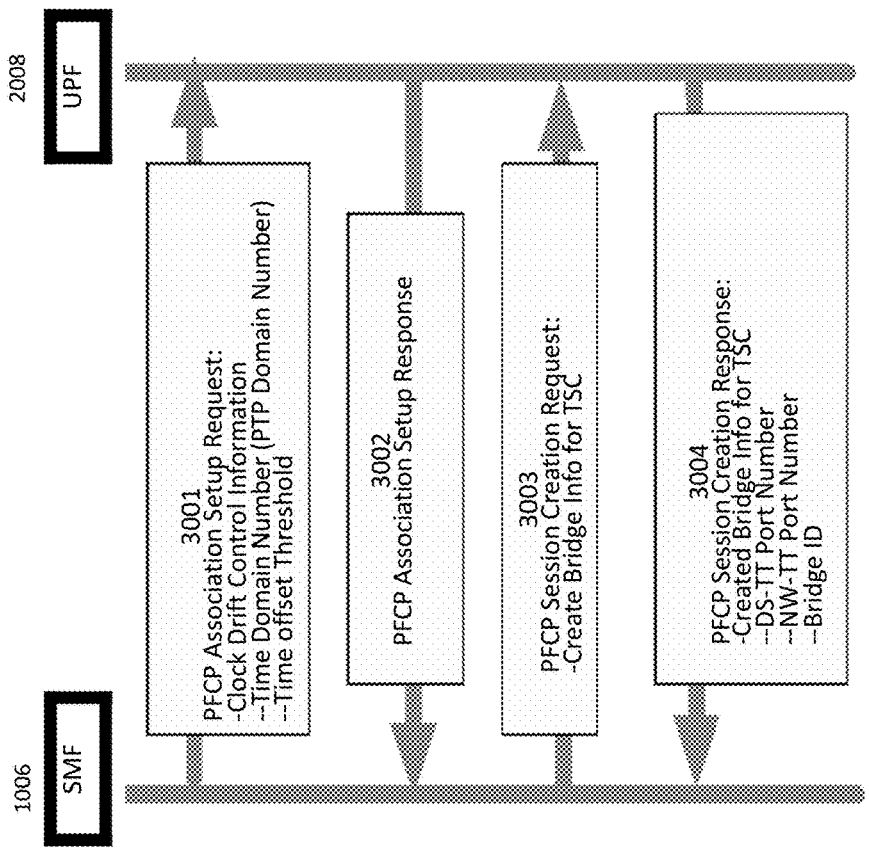
FIG. 3 illustrates an example call flow for SMF provisioning the relevant rules at UPF for clock synchronization and TT-port creation.
Figure 5:
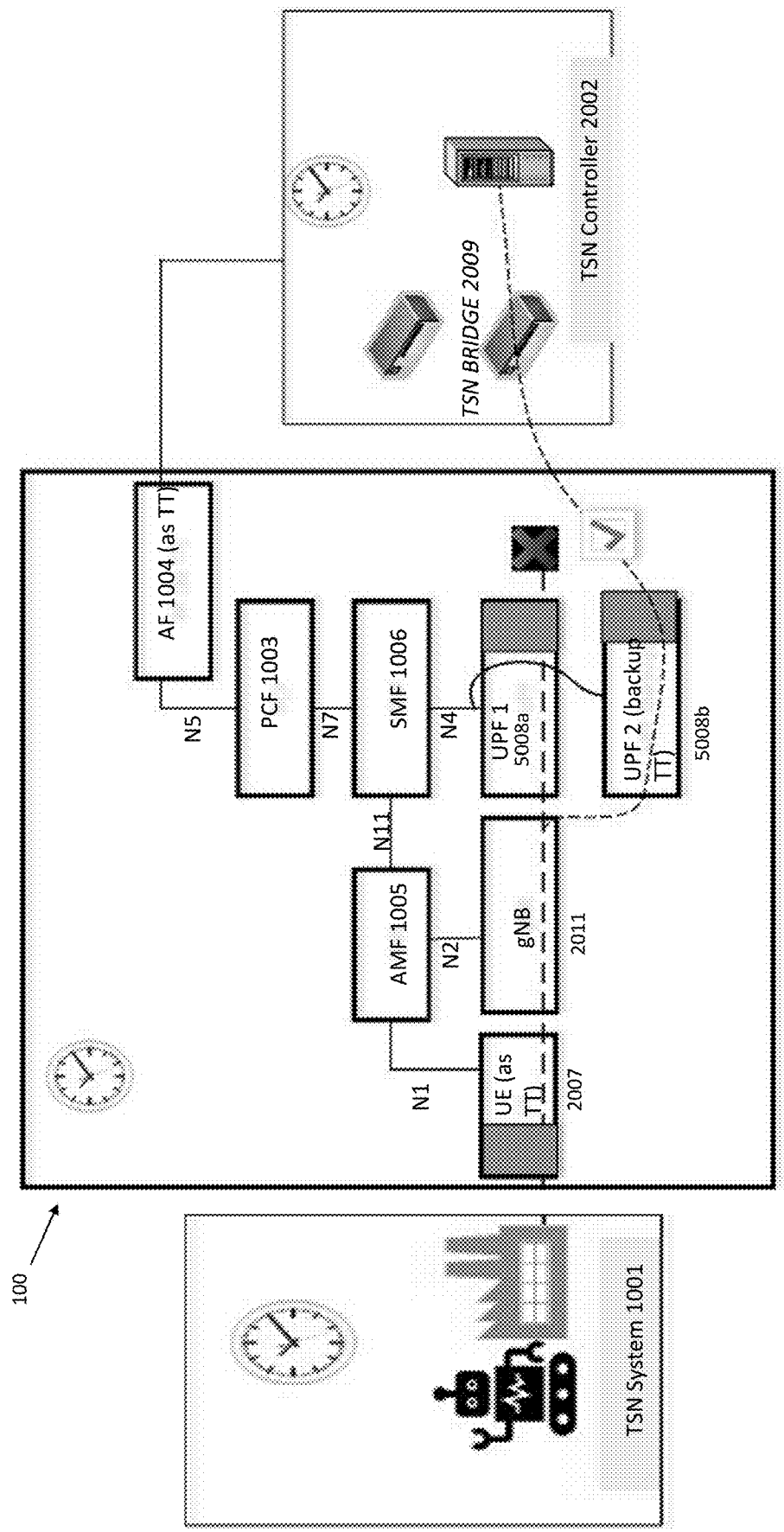
FIG. 5 shows an example in which a TSN connection is switched to a back-up UPF.
Figure 7:
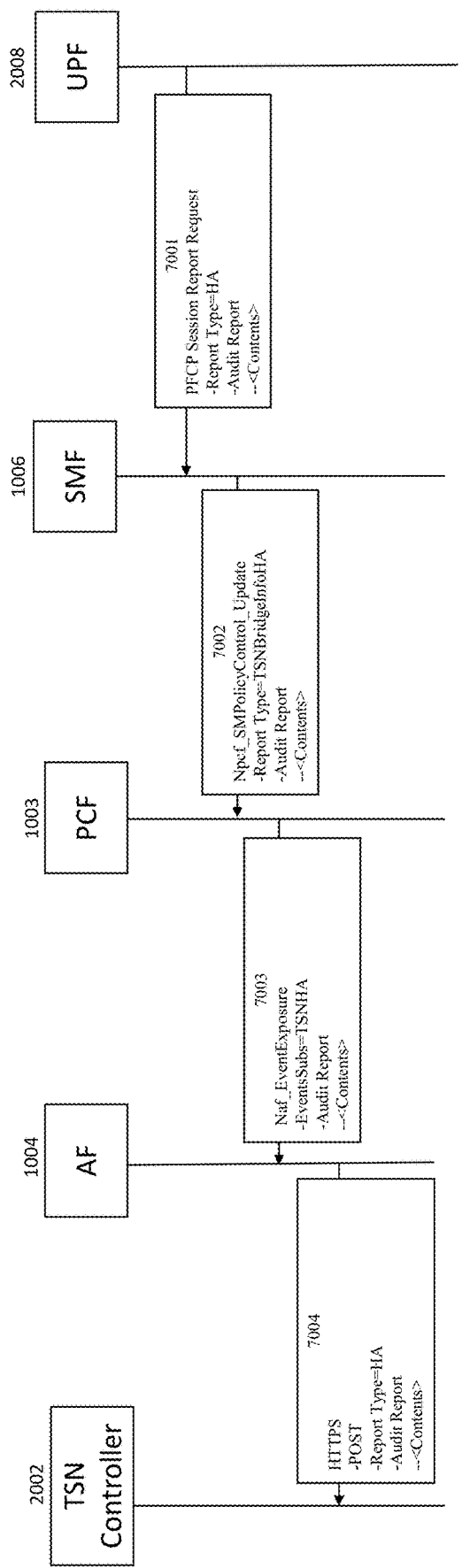
FIG. 7 illustrates a call flow for yet another example embodiment of a method according to the present disclosure.

In the event of a switch-over of the connection from UPF (TT) to the UPF (Backup TT), the ethernet ports (DS-TT and NW-TT) created at the UPF(TT) are also switched, which results in a temporary pause of the connection with the TSN System. Because the CP is unaware of the connection reset, resulting loss of synchronization occurs among the TSN devices. In order to overcome this problem, in an example embodiment of a method according to the present disclosure, in the event of a switch-over, the UP notifies the CP about the HA action (i.e., the switch-over of the connection), so that the AF (working as TT) can inform the TSN controller about the time gaps. In block 7001 in FIG. 7, UPF 2008 (which corresponds to UPF 2 serving as the back-up TT shown in FIG. 5) sends to SMF 1006 a "PFCP Session Report Request" including i) Report Type=HA, and ii) an Audit Report having specified contents. The contents of an Audit Report can include the following fields:

Operation Status: <up down>
IP Address: <ipv4address ipv6address>
Display Name: <string>
Interface Name: <string>,
VRF (s): <string "," separated>
VLAN(s): <integer "," separated>
Old Physical Address: <macAddress>
New Physical Address: <macAddress>
(protocol) Type: <IP|Ethernet>
Start Time for TSN session for a specific connection: <Date Time>
Previous Down Time: <Date Time>
Duration of Down Time: <milliseconds>

As an example, the following could be included in the Audit Report:

Operation Status: up
IP Address: [10.10.1.2]
Display Name: UPF[TT]
Interface Name: eth5
VRF: VRF1
VLAN: 501
Old Physical Address: 10-65-30-12-F5-1B
New Physical Address: 20-65-30-12-F7-1C
(protocol) Type: Ethernet
Start Time for TSN session for a specific connection: 7/16/2020, 12:39:57 PM
Previous Down Time: 7/17/2020, 19:44:50 PM
Duration of Down Time: 38000 ms Next, as shown in block 7002 in FIG. 7, SMF 1006 sends to PCF 1003 an update, NPCF Session Management Policy Control Update (Npcf_SMPolicyControl_Update), which message includes i) Report Type=TSN Bridge Information HA (TSNBridgeInfoHA), and ii) the Audit Report received from UPF 2008. In block 7003, PCF 1003 sends to AF 1004 a Network Application Function (NAF) Event Exposure message including: i) Events Subscription=TSNHA, and ii) the Audit Report received from SMF 1006. In block 7004, AF 1004 sends to TSN controller 2002 a Hypertext Transfer Protocol Secure (HTTPS) POST request message including i) Report Type=HA, and ii) the Audit Report received from PCF 1003. The survival time can be computed at SMF 1006 or AF 1004.

The example embodiments of the method according to the present disclosure provide the advantage of enabling the CP to be informed of TSN data traffic stoppage, e.g., due to down time and/or a reset of the UP connection. By having the UP notify the SMF in the CP about TSN data-traffic-stoppage events, the network operator is able to obtain the correct timings during which the UP was unable to handle the data traffic on the communication channel, i.e., the path between the Device-Side TSN Translator (DS-TT), e.g., UE, and Network-Side TSN Translator (NW-TT), e.g., UPF. The notification from the UP enables correct computing of the survival time of the communication channel.

Although the example method according to the present disclosure has been described in the context of 5G network, the method according to the present disclosure is not limited to 5G, e.g., the method can be applied to 4G network.

As a summary, several examples of the method according to the present disclosure are provided.

A first example of the method according to the present disclosure provides a method for time sensitive network (TSN) operation, comprising:
  in the case of data traffic stoppage in a communication channel of TSN due to at least one of down time of a user plane (UP) connection and a reset of the UP connection, performing the following:
  generating, by a user plane function (UPF), an audit report about the at least one of the down time and the reset;
  sending, by the UPF, the audit report to a first element in control plane (CP), without waiting for communication from the CP; and
  determining, by one of the first element or a second element in the CP, survival time of the communication channel.

In a second example of the method modifying the first example of the method, the first element in the CP is a session management function (SMF).

In a third example of the method modifying the second example of the method, the second element in the CP is an application function (AF).

In a fourth example of the method modifying the first example of the method, the UPF sends the audit report to the first element in the CP without waiting for communication from the CP.

In a fifth example of the method modifying the second example of the method, the audit report is sent along with a report type indicating one of i) down time of the UP connection due to connection fluctuation, or ii) down time of the UP connection due to a switch-over of the UP connection from a primary user plane function (UPF) to a back-up UPF.

In a sixth example of the method modifying the fifth example of the method, in the case the down time of the UP connection is due to the switch-over of the UP connection from the primary user plane function (UPF) to the back-up UPF, the audit report is sent by the back-up UPF.

In a seventh example of the method modifying the first example of the method, the UPF sends the audit report to the first element in the CP without waiting for communication from the CP.

In an eighth example of the method modifying the fifth example of the method, in the case the report type indicates down time of the UP connection due to connection fluctuation, the audit report includes at least one of the following information: operation status, IP address: display name; interface name; virtual routing and forwards (VRF); virtual local area network (VLAN); physical address; protocol type; start time for TSN session; previous down time; and duration of down time.

In a ninth example of the method modifying the sixth example of the method, in the case the report type indicates down time of the UP connection due to the switch-over of the UP connection from the primary user plane function (UPF) to the back-up UPF, the audit report includes at least one of the following information: operation status, IP address: display name; interface name; virtual routing and forwards (VRF); virtual local area network (VLAN); old physical address; new physical address; protocol type; start time for TSN session; previous down time; and duration of down time.

In a tenth example of the method modifying the eighth example of the method, the method further comprising:
sending, by the SMF to a policy control function (PCF), an update message including the audit report received from the UPF.

In an eleventh example of the method modifying the tenth example of the method, the method further comprising:
sending, by the PCF to an application function (AF), a message including the audit report received from the SMF.

In a twelfth example of the method modifying the eleventh example of the method, the method further comprising:
sending, by the AF to a TSN controller, a hypertext transfer protocol secure (HTTPS) POST request message including the audit report received from the PCF.

In a thirteenth example of the method modifying the twelfth example of the method, the survival time is determined by one of the SMF or the AF.

In a fourteenth example of the method modifying the ninth example of the method, the method further comprising:
sending, by the SMF to a policy control function (PCF), an update message including the audit report received from the UPF.

In a fifteenth example of the method modifying the fourteenth example of the method, the method further comprising:
sending, by the PCF to an application function (AF), a message including the audit report received from the SMF.

In a sixteenth example of the method modifying the fifteenth example of the method, the method further comprising:
sending, by the AF to a TSN controller, a hypertext transfer protocol secure (HTTPS) POST request message including the audit report received from the PCF.

In a seventeenth example of the method modifying the sixteenth example of the method, the survival time is determined by one of the SMF or the AF.

In an eighteenth example of the method modifying the third example of the method, the audit report is sent along with a report type indicating one of i) down time of the UP connection due to connection fluctuation, or ii) down time of the UP connection due to a switch-over of the UP connection from a primary user plane function (UPF) to a back-up UPF.

In a nineteenth example of the method modifying the eighteenth example of the method, in the case the report type indicates down time of the UP connection due to connection fluctuation, the audit report includes at least one of the following information: operation status, IP address: display name; interface name; virtual routing and forwards (VRF); virtual local area network (VLAN); physical address; protocol type; start time for TSN session; previous down time; and duration of down time.

In a twentieth example of the method modifying the eighteenth example of the method, in the case the down time of the UP connection is due to the switch-over of the UP connection from the primary user plane function (UPF) to the back-up UPF, the audit report is sent by the back-up UPF.

Glossary of Terms

3GPP: Third generation partnership project
5G: 5th Generation
5GC: 5G Core Network
5GS: 5G System
AF: Application Function
AMF: Access and Mobility Management Function
CP: Control Plane
DL: Downlink
DN: Data Network
DNN: Data Network Name
DS-TT: Device-Side TSN Translator
eNB: Evolved Node B
FH: Fronthaul
FFT: Fast Fourier Transform
gNB: Next Generation Node B
HA: High availability
iFFT: inverse Fast Fourier Transform
MAC address: Media Access Control address
NW-TT: Network-side TSN Translator
PCF: Policy Control Function
PDU session: Protocol Data Unit session
PFCP: Packet Forwarding Control Protocol
PPP Point-to-Point Protocol
PTP: Precision Time Protocol
SMF: Session Management Function
TSC: Time Sensitive Connection
TSN: Time Sensitive Network
TT: TSN Translator
UE: User Equipment
UL: Uplink
UP: User Plane
UPF: User Plane Function
VLAN: Virtual Local Area Network
VRF: Virtual routing and forwarding

What is claimed is:

1. A method for time sensitive network (TSN) operation during data traffic stoppage occurring in a communication channel of TSN due to a down time of a user plane (UP) connection due to a switch-over of the UP connection from a primary user plane function (UPF) to a back-up UPF, comprising:
generating, by a user plane function (UPF), an audit report about the down time of the UP connection due to the switch-over of the UP connection, wherein the audit report is sent along with report type indicating the down time of the UP connection due to the switch-over of the UP connection from the primary user plane function (UPF) to the back-up UPF;
sending, by the back-up UPF, the audit report to a first element in control plane (CP), without waiting for communication from the CP, wherein the first element in the CP is a session management function (SMF); and
determining, by one of the first element or a second element in the CP, survival time of the communication channel.

2. The method according to claim 1, wherein:
the audit report includes at least one of the following information: operation status, IP address: display name; interface name; virtual routing and forwards (VRF); virtual local area network (VLAN); old physical address; new physical address; protocol type; start time for TSN session; previous down time; and duration of down time.

3. A method for time sensitive network (TSN) operation during data traffic stoppage in a communication channel of TSN due to a down time of a user plane (UP) connection due to connection fluctuation, comprising:
generating, by a user plane function (UPF), an audit report about the down time, wherein the audit report is sent along with a report type indicating the down time of the UP connection due to connection fluctuation, and wherein the audit report includes at least one of the following information: operation status, IP address: display name; interface name; virtual routing and forwards (VRF); virtual local area network (VLAN); physical address; protocol type; start time for TSN session; previous down time; and duration of down time;

sending, by the UPF, the audit report to a first element in control plane (CP), without waiting for communication from the CP, wherein the first element in the CP is a session management function (SMF);

determining, by one of the first element or a second element in the CP, survival time of the communication channel; and sending, by the SMF to a policy control function (PCF), an update message including the audit report received from the UPF.

4. The method of claim 3, further comprising:

sending, by the PCF to an application function (AF), a message including the audit report received from the SMF.

5. The method of claim 4, further comprising:

sending, by the AF to a TSN controller, a hypertext transfer protocol secure (HTTPS) POST request message including the audit report received from the PCF.

6. The method of claim 5, wherein:

the survival time is determined by one of the SMF or the AF.

7. The method according to claim 2, further comprising:

sending, by the SMF to a policy control function (PCF), an update message including the audit report received from the back-up UPF.

8. The method of claim 7, further comprising:

sending, by the PCF to an application function (AF), a message including the audit report received from the SMF.

9. The method of claim 8, further comprising:

sending, by the AF to a TSN controller, a hypertext transfer protocol secure (HTTPS) POST request message including the audit report received from the PCF.

10. The method of claim 9, wherein:

the survival time is determined by one of the SMF or the AF.

11. A method for time sensitive network (TSN) operation during data traffic stoppage occurring in communication channel of TSN due to a down time of a user plane (UP) connection due to a switch-over of the UP connection from a primary user plane function (UPF) to a back-up UPF, comprising:

generation, by a user plane function (UPF), an audit report about the down time of the UP connection due to the switch-over of the UP connection, wherein the audit report is sent along with a report type indicating the down time of the UP connection due to the switch-over of the UP connection for the primary user plane function (UPF) to the back-up UPF;

sending, by the back-up UPF, the audit report to a first element in control plane (CP), without waiting for communication from the CP, wherein the first element in the CP is a session management function (SMF); and determining, by one of the first element or a second element in the CP, survival time of the communication channel, wherein the second element in the CP is an application function (AF).

* * * * *